United States Patent
Lim

(10) Patent No.: US 8,850,084 B2
(45) Date of Patent: Sep. 30, 2014

(54) DATA PROCESSING SYSTEMS FOR AUDIO SIGNALS AND METHODS OF OPERATING SAME

(75) Inventor: Kil-Yeon Lim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 316 days.

(21) Appl. No.: 13/421,484

(22) Filed: Mar. 15, 2012

(65) Prior Publication Data

US 2012/0246352 A1    Sep. 27, 2012

(30) Foreign Application Priority Data

Mar. 24, 2011    (KR) .................... 10-2011-0026590

(51) Int. Cl.
 *G06F 13/28* (2006.01)
 *H04L 12/54* (2013.01)
(52) U.S. Cl.
 CPC ............. *G06F 13/28* (2013.01); *Y02B 60/1228* (2013.01); *Y02B 60/1235* (2013.01); *H04L 12/56* (2013.01)
 USPC .................. 710/22; 710/23; 710/24; 710/25; 710/26; 710/27; 710/28
(58) Field of Classification Search
 CPC  G06F 13/28; Y02B 60/1228; Y02B 60/1235; H04L 12/56
 See application file for complete search history.

(56) References Cited

U.S. PATENT DOCUMENTS

| | | | | |
|---|---|---|---|---|
| 4,475,155 A | * | 10/1984 | Oishi et al. ....................... | 710/22 |
| 4,912,632 A | * | 3/1990 | Gach et al. ....................... | 710/28 |
| 5,265,250 A | * | 11/1993 | Andrade et al. ............... | 718/101 |
| 5,267,098 A | * | 11/1993 | Lokhoff ........................... | 360/50 |
| 5,623,622 A | * | 4/1997 | Yuki et al. ...................... | 711/100 |
| 6,430,628 B1 | * | 8/2002 | Connor ............................. | 710/5 |
| 6,781,589 B2 | * | 8/2004 | Macy et al. .................... | 345/537 |
| 6,862,298 B1 | * | 3/2005 | Smith et al. .................... | 370/516 |
| 7,421,508 B2 | * | 9/2008 | Hannuksela et al. ......... | 709/231 |
| 7,634,227 B2 | * | 12/2009 | de Jong ........................ | 455/3.06 |
| 7,916,742 B1 | * | 3/2011 | Bugenhagen ................. | 370/412 |

(Continued)

FOREIGN PATENT DOCUMENTS

| | | |
|---|---|---|
| JP | 10-290205 | 10/1998 |
| JP | 2005-236641 | 9/2005 |
| JP | 2006-120260 | 5/2006 |

OTHER PUBLICATIONS

"Sfront Reference Manual: Part II/3: Audio Drivers" by John Lazzaro and John Wawrzynek, 1999, http://www.eecs.berkeley.edu/~lazzaro/sa/sfman/devel/adriver/.*

(Continued)

*Primary Examiner* — Henry Tsai
*Assistant Examiner* — Jing-Yih Shyu
(74) *Attorney, Agent, or Firm* — Myers Bigel Sibley & Sajovec, PA

(57) ABSTRACT

A data processing system includes an audio processor with a main memory for storing data, first and second buffers for temporarily storing the data to input/output an audio signal, and a data input/output (I/O) unit for outputting the stored data. A direct memory access (DMA) controller is provided for transmitting data between the main memory and the first and second buffers according to a DMA transmission process. If transmission of the data stored in the first buffer ends and an interrupt signal is thus generated, the DMA controller increases sizes of the first and second buffers during transmission of the data stored in the second buffer.

12 Claims, 11 Drawing Sheets

(56) References Cited

U.S. PATENT DOCUMENTS

| | | | |
|---|---|---|---|
| 8,213,444 B1* | 7/2012 | Harris et al. | 370/412 |
| 8,316,185 B2* | 11/2012 | Sih et al. | 711/118 |
| 2003/0163328 A1* | 8/2003 | Rambo et al. | 704/500 |
| 2004/0128511 A1* | 7/2004 | Sun et al. | 713/176 |
| 2006/0056383 A1* | 3/2006 | Black et al. | 370/350 |
| 2006/0206635 A1* | 9/2006 | Alexander et al. | 710/22 |
| 2008/0091851 A1* | 4/2008 | Sierra | 710/22 |

OTHER PUBLICATIONS

"A single receiving chip for DVB data broadcasting system" by Guanghui He, Ningyi Xu ; Wei Yu ; Zucheng Zhou; IEEE Transactions on Consumer Electronics, vol. 52, No. 3, Aug. 2006.*

* cited by examiner

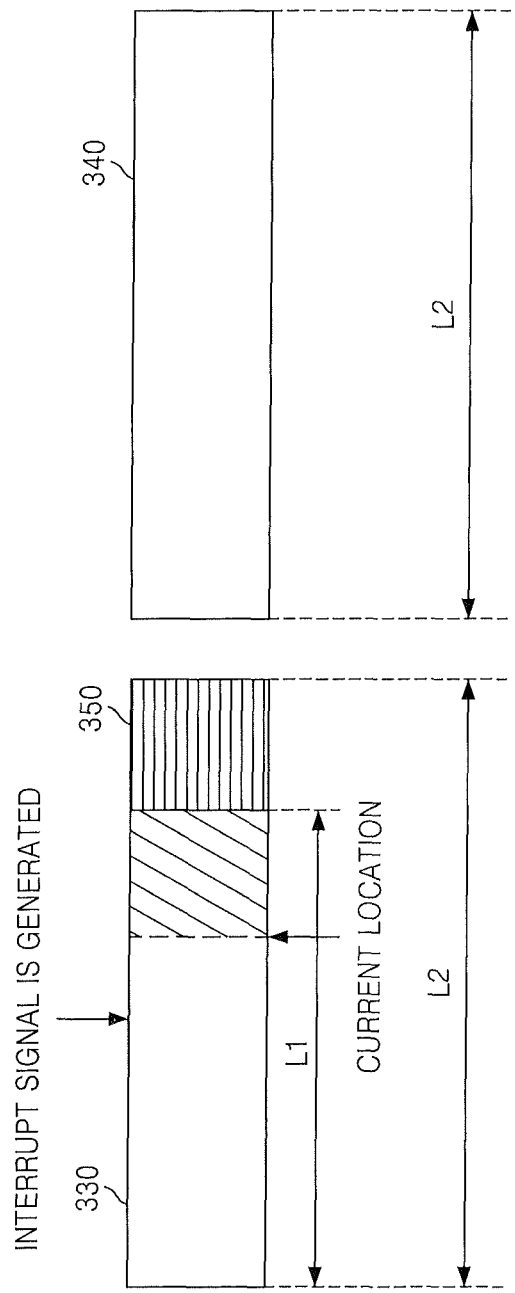

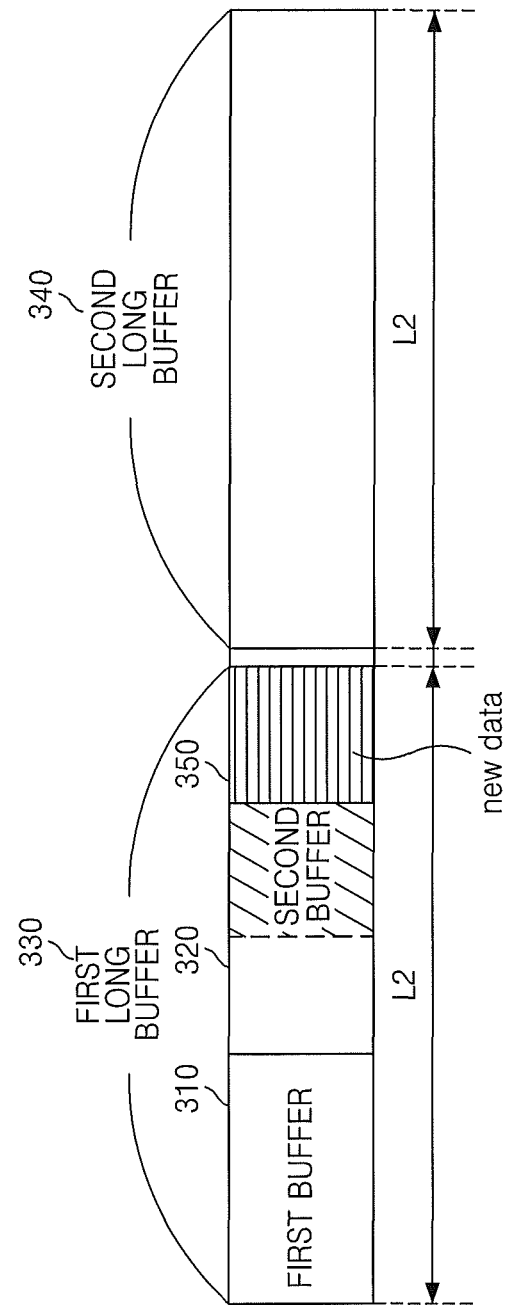

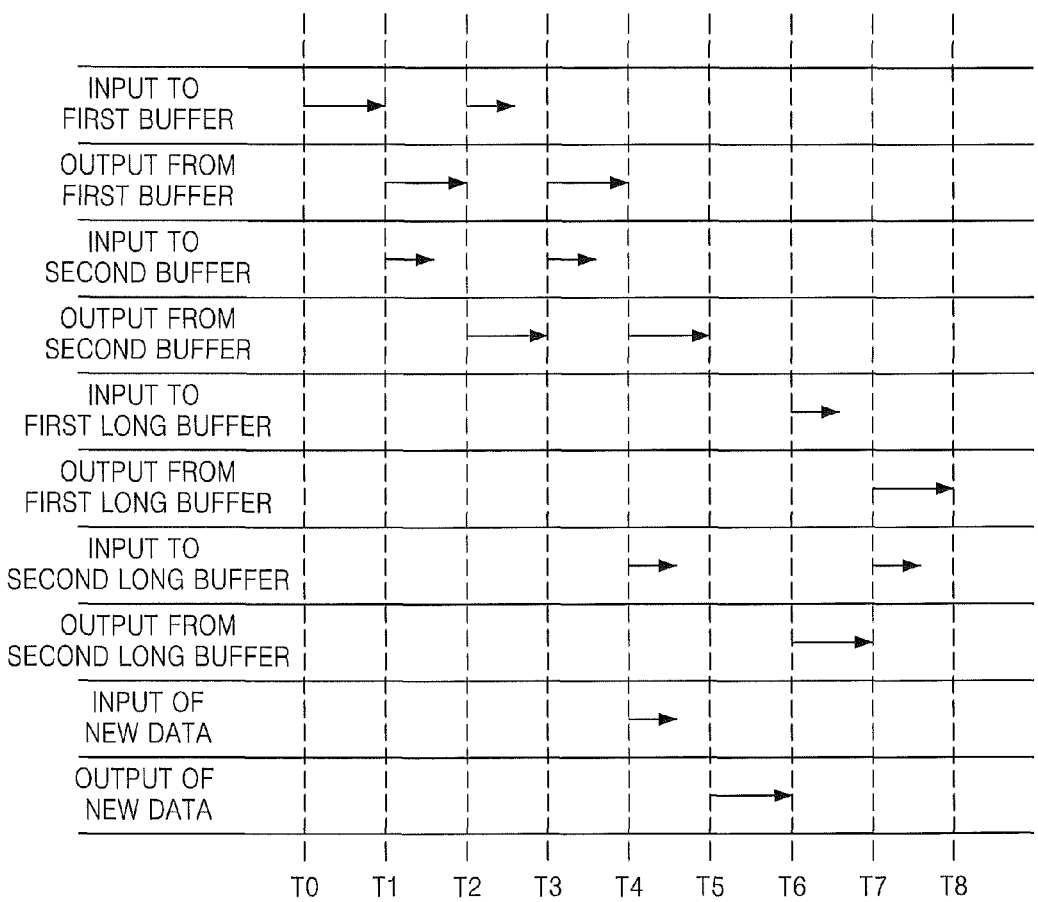

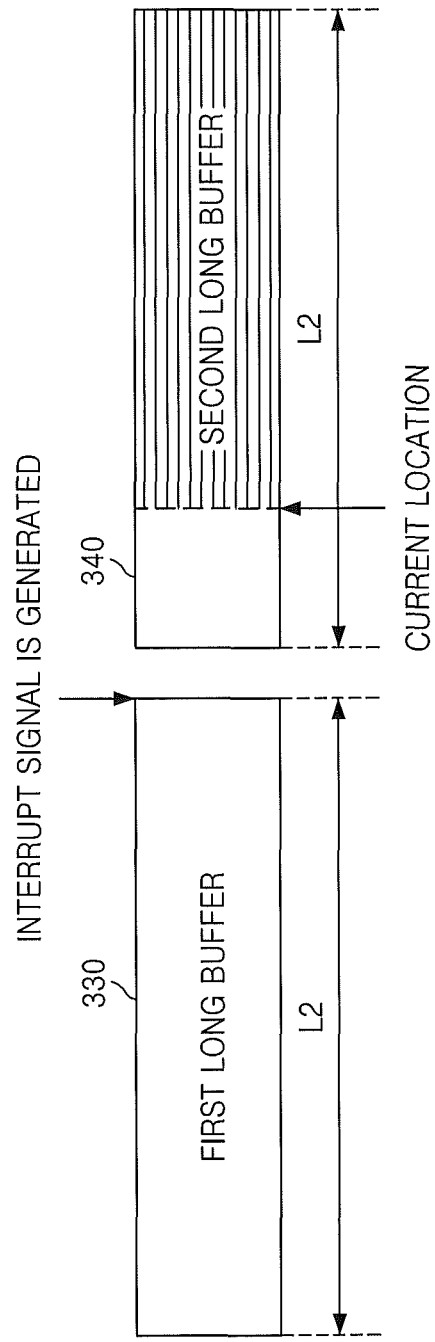

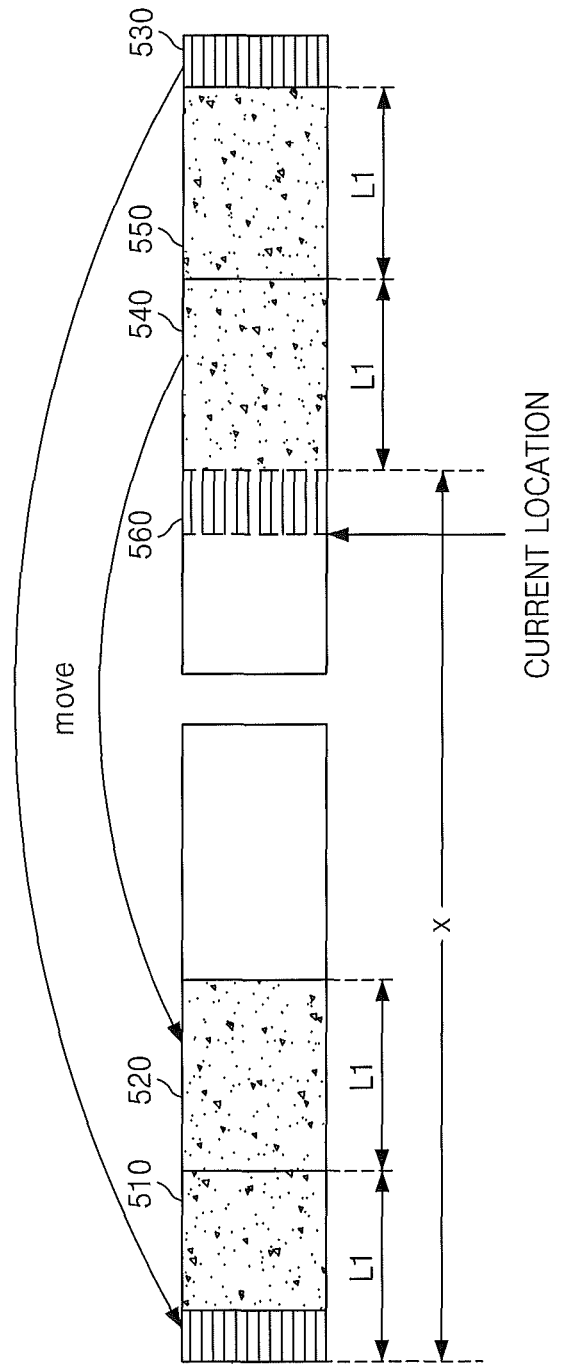

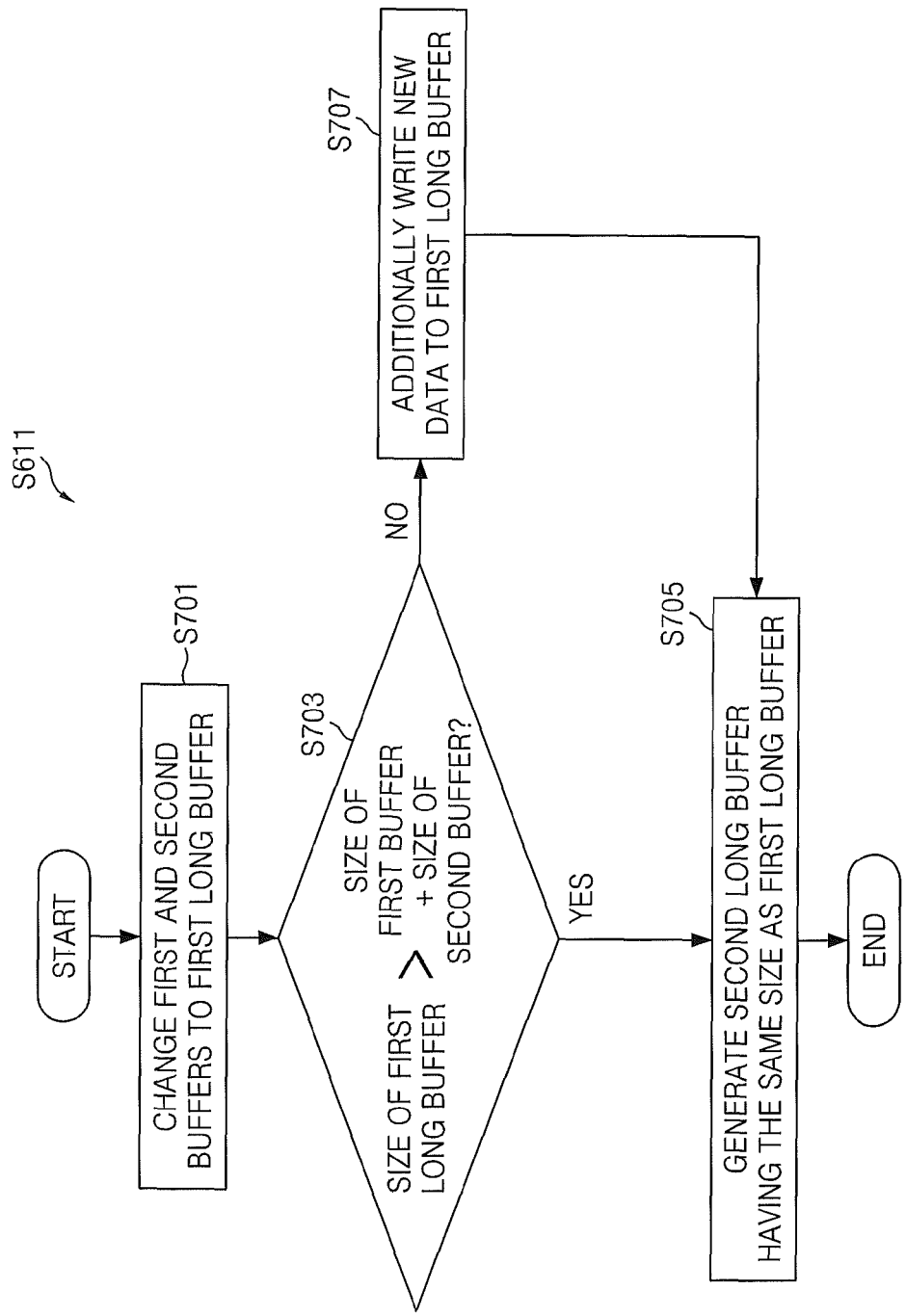

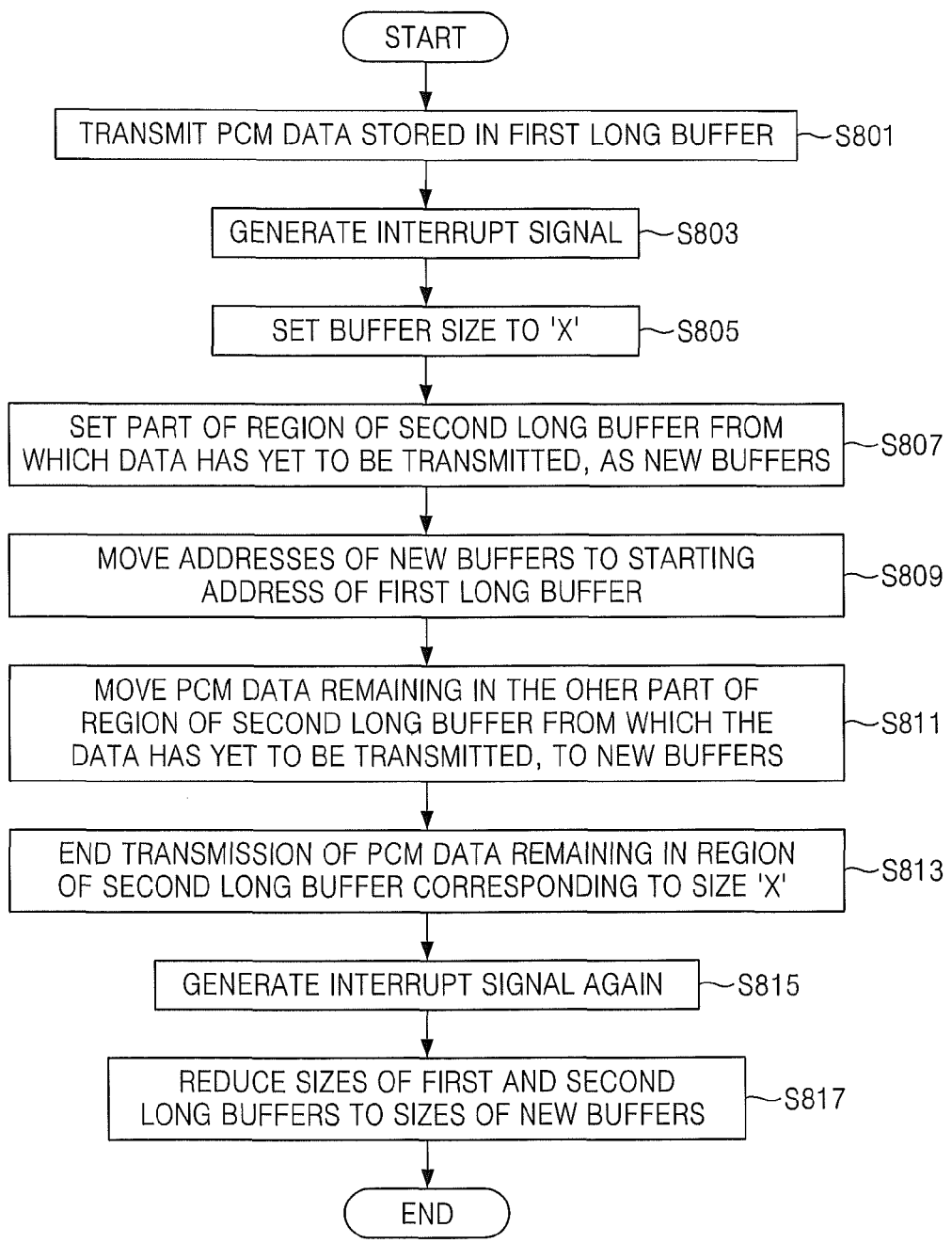

DATA PROCESSING SYSTEMS FOR AUDIO SIGNALS AND METHODS OF OPERATING SAME

REFERENCE TO PRIORITY APPLICATION

This application claims the benefit of Korean Patent Application No. 10-2011-0026590, filed Mar. 24, 2011, the disclosure of which is hereby incorporated herein by reference.

FIELD

The inventive concept relates to data processing systems, and more particularly, to audio data processing systems.

BACKGROUND

Recently, as information technology has rapidly advanced, the use of mobile devices for playing digital music files or the like (e.g., an MP3 player) has become widespread because users can conveniently carry such mobile devices and listen to selected music regardless of time and place. In order to allow a user to listen to audio data, the audio data should be decoded into pulse code modulation (PCM) format data, which is a type of digital format. Then, the PCM data can transmitted to a Digital-to-Analog Converter (DAC) and then converted into analog data that can produce an audible sound. Current state-of-the-art mobile devices are capable of playing data from various sound sources (e.g., audio data added to video data, mp3 files, and sound effects according to a user event). Furthermore, there are trends associated with converging not only audio data playback but also various functions (e.g., game services and web services) into a single mobile device. Accordingly, there is a growing need to drive such various functions at low power.

In the case of a low-power audio system that may be operated with low power, if audio data is played and a user's activity is not sensed, then power blocks except for audio blocks are 'OFF'. Reading, decoding, and rendering should be periodically performed to play audio data. In general, reading and decoding are respectively performed via a parser and a decoder and are thus subject to the parser and the decoder, whereas rendering is subject to a direct memory access (DMA) buffer. However, because the size of the DMA buffer is fixed, it typically cannot be dynamically adjusted to play audio files.

SUMMARY

According to an aspect of the inventive concept, there is provided a data processing system including an audio processor comprising a plurality of buffers configured to store audio data and a data input/output (I/O) unit for outputting the stored audio data, and a direct memory access (DMA) controller configured to transmit audio data stored in a second of the plurality of buffers in response to a first interrupt signal designating termination of transmission of audio data stored in a first of the plurality of buffers and increase sizes of the plurality of buffers into a plurality of long buffers during transmission of audio data stored in the second buffer.

The data processing system may configured that the plurality of long buffers have equivalent storage sizes and a storage size of each of the plurality of long buffers is greater than a sum of a size of the first buffer and a size of the second buffer.

Said DMA controller is further configured to receive new data from a main memory and, when the size of each of the plurality of long buffers is less than the sum of the size of the first buffer and second buffer, increase a size of a first of the plurality of long buffers corresponding to the first buffer in order to store the new data in the first long buffer and adjust the size of each of the plurality of long buffers to be equal to the size of the first long buffer. Said DMA controller is further configured to finish storing the new data in the first long buffer in advance of transmitting all audio data stored in the second buffer. Said DMA controller is further configured to transmit the new data from the first long buffer and, before transmission of the new data from the first long buffer ends, said DMA controller completes storing of other new data received from the main memory into the second long buffer corresponding to the second buffer.

Said DMA controller sets a size X by adding a size of the first long buffer, a count value of the second long buffer when the second interrupt signal is generated and a size of a spare buffer determined by a time required to transmit data stored in a new buffer obtained by reducing the size of the second long buffer in response to generation of a second interrupt signal designating termination of transmission of data from the first long buffer. The size X is calculated according to the following formula: TC+(T1*R*B*C/8)+T2, wherein 'TC' denotes a current transmission count, 'T1' denotes a time required to copy data to the new buffer, 'T2' denotes a time required to transmit the data stored in the new buffer, 'R' denotes a sampling rate, 'B' denotes a sample bit length, and 'C' denotes a channel count.

Said DMA controller moves an address of the new buffers to a starting address of the first long buffer, moves the data, which is stored in the second long buffer and is ready to be transmitted, to the new buffers, and reduces a total size of the plurality of long buffers to the size of the new buffers when a third interrupt signal is generated designating termination of transmission of data from the second long buffer.

According to an embodiment of the inventive concept, there is provided a method of operating a data processing system, the method comprising receiving data and storing the data in a plurality of buffers, transmitting the stored data to a data input/output (I/O) unit so as to output the stored data, generating a first interrupt signal when transmission of data stored in a first buffer from among the plurality of buffers ends, transmitting data stored in a second buffer from among the plurality of buffers when the first interrupt signal is generated and increasing sizes of the plurality of buffers during the transmission of the data stored in the second buffer.

The increasing of the sizes of the plurality of buffers comprises changing the plurality of buffers to a plurality of long buffers. The increasing of the sizes of the plurality of buffers further comprises, when the size of each of the plurality of long buffers is less than a sum of the sizes of the first buffer and the second buffer, increasing the size of a first long buffer corresponding to the first buffer from among the plurality of long buffers so as to store new data in the first long buffer and adjusting the sizes of the plurality of long buffers to be equal to the size of the first long buffer. The transmitting data stored in the second buffer comprises completing storing of the new data in the first long buffer in advance of transmission of all data stored in the second buffer. The transmitting data stored in the second buffer comprises, in advance of transmission of the data from the first long buffer, completing storing of other new data in a second long buffer corresponding to the second buffer from among the plurality of long buffers.

In response to generation of a second interrupt signal designating termination of transmission of data from the first long buffer, a size X is set by adding a size of the first long buffer, a count value of the second long buffer when the second interrupt signal is generated, and a size of a spare buffer determined by a time required to transmit data stored in a new buffer obtained by reducing the size of the second long buffer together. The size X is calculated according to the following formula, TC+(T1*R*B*C/8)+T2, wherein 'TC' denotes a current transmission count, 'T1' denotes a time required to copy data to the new buffer, 'T2' denotes a time required to transmit data stored in the new buffer, denotes a sampling rate, 'B' denotes a sample bit length, and 'C' denotes a channel count.

The method may further include moving an address of the new buffer to a starting address of the first long buffer, moving the data, which is stored in the second long buffer and is ready to be transmitted, to the new buffer, generating an interrupt signal when the transmission of the data from the second long buffer ends, and reducing the total size of the plurality of long buffers to the size of the new buffer.

BRIEF DESCRIPTION OF THE DRAWINGS

Exemplary embodiments of the inventive concept will be more clearly understood from the following detailed description taken in conjunction with the accompanying drawings in which:

FIGS. 3A and 3B are diagrams illustrating a process of increasing buffer size, according to an embodiment of the inventive concept;

FIGS. 4A and 4B are diagrams specifically illustrating the process of FIGS. 3A and 3B;

FIGS. 5A and 5B are diagrams illustrating a process of reducing buffer size, according to an embodiment of the inventive concept;

FIG. 7 is a flowchart specifically illustrating an operation of increasing buffer size, which is included in the process of FIG. 6, according to an embodiment of the inventive concept; and FIG. 8 is a flowchart illustrating a process of reducing buffer size, according to an embodiment of the inventive concept.

DETAILED DESCRIPTION OF THE EMBODIMENTS

Figure 1:
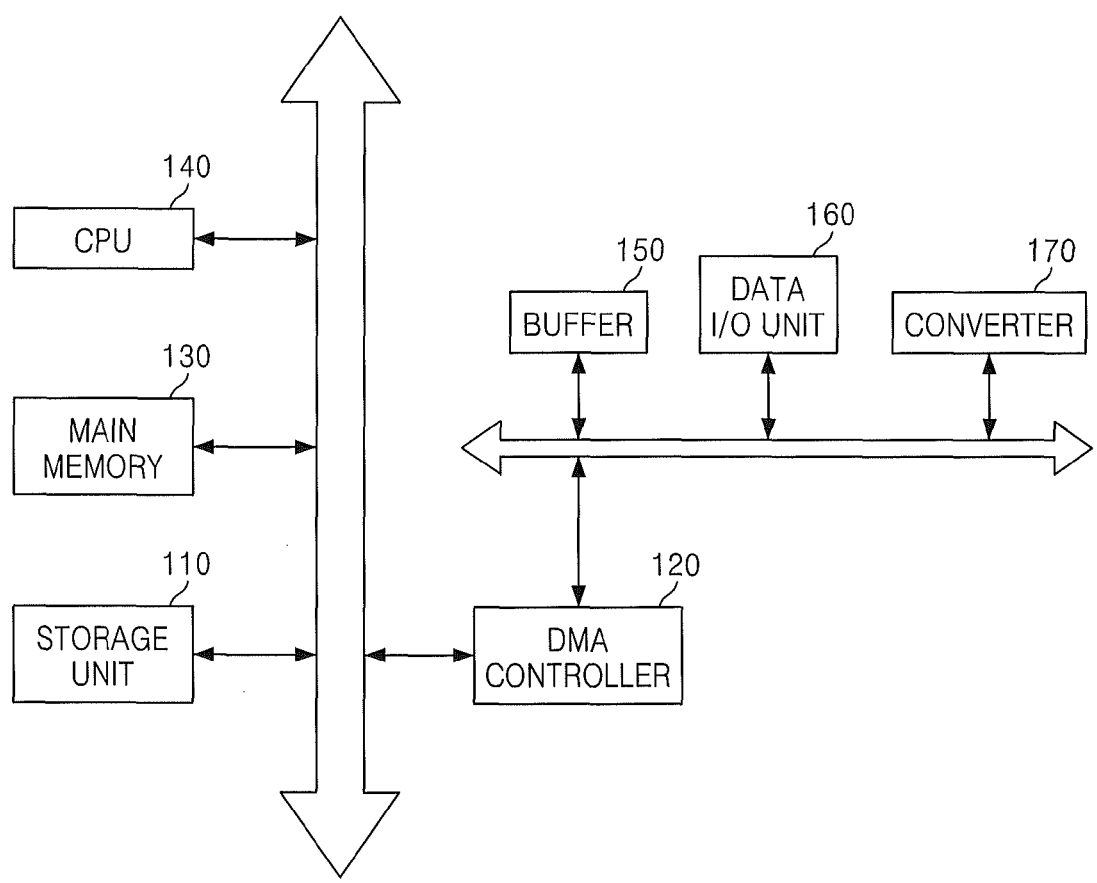
FIG. 1 is a diagram illustrating a state in which elements of a data processing system are connected, according to an embodiment of the inventive concept.

The inventive concept will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, exemplary embodiments of the inventive concept will be described in greater detail with reference to the accompanying drawings.

In the present specification, the inventive concept has been described with respect to pulse code modulation (PCM) data but is not limited thereto, and may be applied to various data that may be transmitted via a buffer. FIG. 1 is a diagram illustrating a state in which some elements of a data processing system are connected, according to an embodiment of the inventive concept. The data processing system 100 may include a storage unit 110, a direct memory access (DMA) controller 120, a main memory 130, a central processing unit (CPU) 140, a buffer 150, a data input/output (I/O) unit 160, and a converter 170. The data processing system 100 may be embodied as, for example, a personal computer (PC), a tablet PC, a notebook computer, a memory card, a smart card, a mobile phone, a smart phone, a navigator, a data server, a hard disk drive (HDD), a solid state drive (SSD), or a network-attached storage (NAS).

The storage unit 110, the DMA controller 120, the main memory 130, and the CPU 140 are connected to each other via a first bus. In addition, the DMA controller 120, the buffer 150, the data I/O unit 160 and the converter 170 are connected via a second bus, which may be combined with the first bus as a single bus. In general, in the data processing apparatus 100, the CPU 140 repeatedly reads video/audio data from or writes video/audio data to the main memory 130. Thus, in order to reduce load on the CPU 140, exchange of data (e.g., audio/video data) may be performed between the main memory 130 and the data I/O unit 160 according to a DMA transmission process. Since the DMA transmission process is used, data may be exchanged between the main memory 130 and the data I/O unit 160 at high speeds without having to use the CPU 140.

The storage unit 110 stores a plurality of pieces of audio/video data. In general, the storage unit 110 may be a magnetic disk (e.g., a hard disk). Alternatively, the plurality of pieces of audio/video data may be stored in an external server (not shown). In this case, the storage unit 110 may be located outside the data processing system 100. The DMA controller 120 may receive various commands from the CPU 140 and may transmit data that is temporarily stored in the main memory 130 to the buffer 150 according to the DMA transmission process. Also, the DMA controller 120 may control the data transmitted to the buffer 150 to the outside via the data I/O unit 160. That is, if the DMA transmission process is used to output audio/video data to the outside, then the DMA controller 120 may instruct and control the whole DMA process.

The main memory 130 temporarily stores audio/video data that is read from the storage unit 110 and interpreted by the CPU 140. The audio/video data stored in the main memory 130 may be transmitted to the buffer 150 according to the DMA transmission process, under control of the CPU 140 and the DMA controller 120. The main memory 130 may be formed as volatile memory, such as dynamic random access memory (DRAM), static RAM (SRAM), thyristor RAM (T-RAM), zero capacitor RAM (Z-RAM), and twin transistor RAM (TTRAM). Alternatively, the main memory 130 may be formed as non-volatile memory, such as Electrically Erasable Programmable Read-Only Memory (EEPROM), flash memory, Magnetic RAM (MRAM), spin-transfer torque MRAM, Conductive Bridging RAM (CBRAM), Ferroelectric RAM (FeRAM), Phase change RAM (PRAM), Resistive RAM (RRAM or ReRAM), nanotube RRAM, Polymer RAM (PoRAM), Nano Floating Gate Memory (NFGM), holographic memory, a molecular electronics memory device, and insulator resistance change memory.

The CPU 140 may be a multi-processor or a multi-core processor manufactured by integrating a plurality of processor cores into one package. The CPU 140 may be involved with overall operations of the data processing system 100. Specifically, the CPU 140 may interpret audio/video data stored in the storage unit 110 in units of data blocks, and temporarily store a result of the interpreting in the main memory 130. Also, the CPU 140 may request or instruct the DMA controller 120 to perform DMA transmission. The buffer 150 temporarily stores audio/video data that is received from the main memory 130 and outputs it to the outside. The buffer 150 may be a ring buffer. In the ring buffer, a plurality of buffers are arranged in such a manner that a first buffer and a last buffer are connected to each other. The ring buffer has an annular data structure. In particular, a combination of two buffers is referred to as a double buffer unit.

Figure 2:
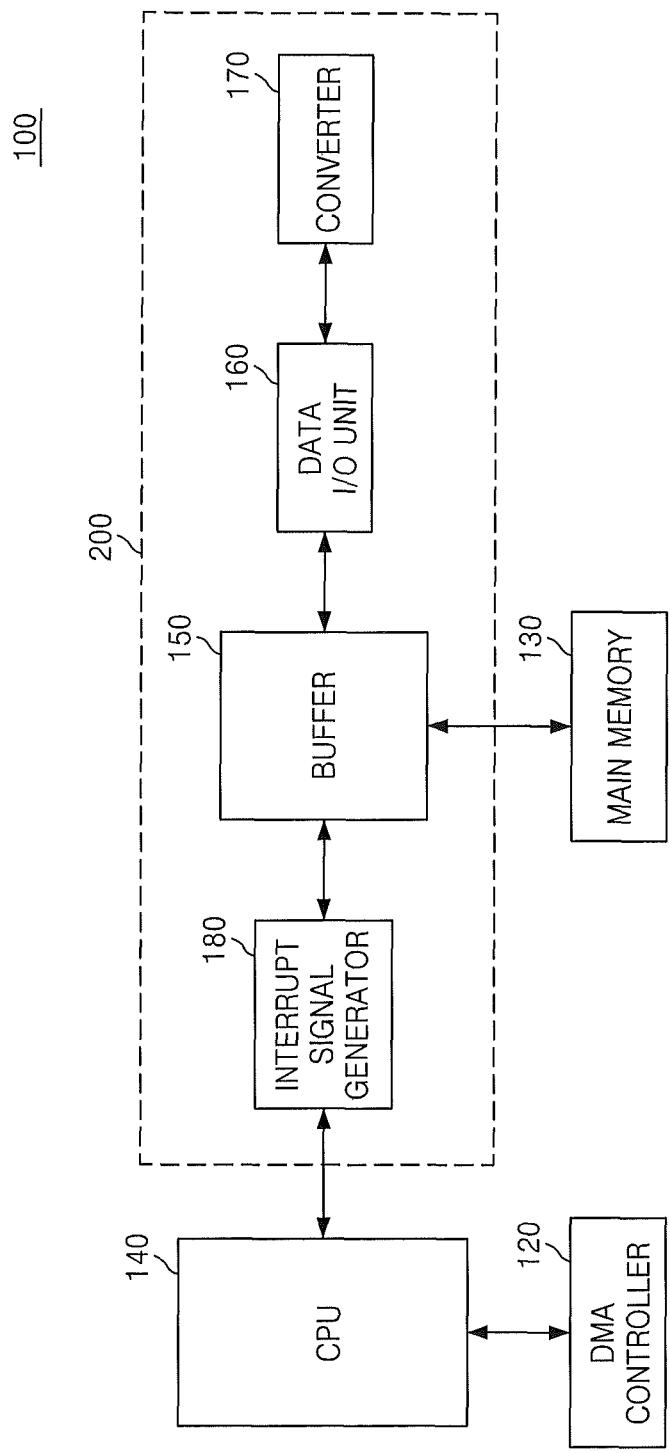
FIG. 2 is a block diagram of the data processing system of FIG. 1, according to an embodiment of the inventive concept.

The data I/O unit 160 may include a First-In First-Out (FIFO) buffer therein to receive data from the buffer 150. Audio data stored in the FIFO buffer may be converted into analog data via the converter 170 and then be output via a speaker (not shown). The converter 170 converts digital data into analog data so that the digital data may be converted into an audible audio signal. FIG. 2 is a block diagram of the data processing system 100 of FIG. 1, according to an embodiment of the inventive concept. The data processing system 100 may include the DMA controller 120, the main memory 130, the CPU 140 and an audio processor 200.

The audio processor 200 may include the buffer 150, the data I/O unit 160, the converter 170, and an interrupt signal generator 180. The data processing system 100 of FIG. 2 will now be described in detail. The audio processor 200 may include a plurality of the buffers 150 for temporarily storing audio data that is to be output to the outside. When a plurality of the buffers 150 is a double buffer, data is stored in a first buffer 150 while data stored in a second buffer 150 is output and then data is stored in the second buffer 150 while the data stored in the first buffer 150 is output. According to an embodiment of the inventive concept, data that is stored in and output from the buffer 150 may be PCM data. The audio processor 200 may further include the interrupt signal generator 180 to supply an interrupt signal indicating a case where the buffer 150 is full of data or is empty to the CPU 140. The audio processor 200 may be connected to the CPU 140 and the other elements via an internal bus (not shown), or may be embodied as a sound card connected to the CPU 140 and the other elements via a peripheral device connecting bus.

Although FIG. 2 illustrates the DMA controller 120 as an independent unit, the DMA controller 120 may be disposed in the CPU 140 or the audio processor 200. An interrupt signal line may be installed between the audio processor 200 and the CPU 140 and the audio processor 200 may transmit various interrupt signals, such as a buffer_empty signal and a buffer_full signal, to the CPU 140. One interrupt signal line may be installed for each of the buffer_empty signal and the buffer_full signal. Otherwise, an OR operation may be performed on interrupt signals output via a plurality of interrupt signal lines, and a result of the performing may be transmitted to the CPU 14Q via one interrupt signal line. Upon receiving the interrupt signal, the CPU 140 gives a DMA transmission command and allows data to be exchanged between the main memory 130 and an external I/O device (not shown). Specifically, when the CPU 140 receives the interrupt signal, the CPU 140 transmits the DMA transmission command that instructs audio data to be written to an empty buffer 150 from among a plurality of the buffers 150. When the CPU 140 receives the buffer_empty signal, the CPU 140 transmits a DMA transmission command indicating an address of the main memory 130 and an address of the empty buffer 150 to the DMA controller 120.

The CPU 140 may generate data by decoding audio data stored in the main memory 130. The DMA controller 120 receives the DMA transmission command from the CPU 140, and transmits data stored in the main memory 130 to the empty buffer 150 from among the plurality of the buffers 150, but the inventive concept is not limited thereto and an operation of the DMA controller 120 depends on the type of DMA employed. For example, the DMA controller 120 may program all of elements that are to be transmitted, before DMA is performed. Then, once a DMA operation begins, the DMA controller 120 may simply fill an empty buffer 150 with data without performing any control operations.

Overall operations of the data processing system 100 will now be described. Operations of the CPU 140 may be divided into a DMA transmission operation of transmitting data blocks in the main memory 130 to the buffer 150 and a data outputting operation of outputting the data blocks in the buffer 150 to the outside. During these operations, the DMA controller 120 may minimize power consumption therein and may adjust the size of the buffer 150 to rapidly process data, in response to a user input. The I/O unit 160 may output audio data stored in the buffer 150 to the converter 170 according to a frequency of sampling the audio data. The converter 170 may convert digital data into analog data.

Figure 3A:
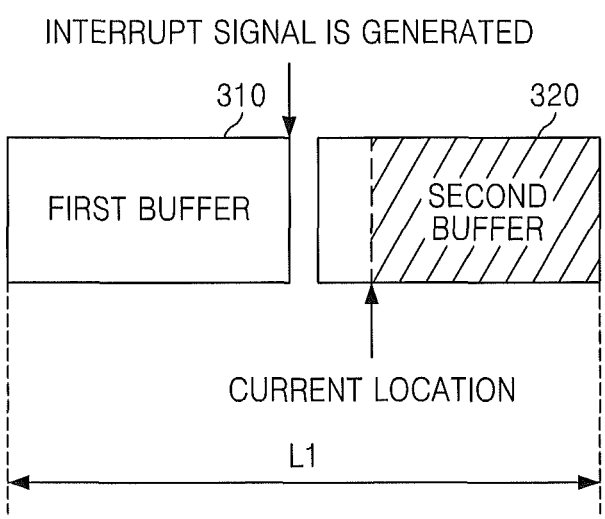

FIGS. 3A and 3B are diagrams illustrating a process of increasing buffer size, according to an embodiment of the inventive concept. The buffer 150 illustrated in FIG. 1 or 2 may be embodied as a double buffer unit consisting of a first buffer 310 and a second buffer 320, but the inventive concept is not limited thereto and the total number of buffers is not limited to just two buffers. Also, the inventive concept is not limited to processing audio data.

In FIG. 3A, the buffer 150 is embodied as the first buffer 310 and the second buffer 320. The data I/O unit 160 of FIG. 2 may read and interpret a data block stored in the first buffer 310 at a rate of a basic sampling frequency. If a time needed to interpret one data block is one unit time, then the first buffer 310 may be emptied after one unit time and then the interrupt signal generator 180 of FIG. 2 may generate an interrupt signal.

FIG. 3A illustrates operations of the first and second buffers 310 and 320, the sizes of which are not increased, according to an embodiment of the inventive concept. Referring to FIG. 3A, no data is stored in the first buffer 310, an interrupt signal is generated, and then data stored in the second buffer 320 is transferred to a FIFO buffer (not shown) of the data I/O unit 160. In FIG. 3A, 'L1' denotes the sum of the sizes of the first and second buffers 310 and 320. Reading, decoding, and rendering may be performed to process audio data. Reading and decoding are performed by the CPU 140 and rendering is subject to the first and second buffers 310 and 320. In other words, when the sizes of the first and second buffers 310 and 320 are increased, a rendering cycle may also be increased. In other words, power is 'OFF' after a decoder (not shown) of the CPU 140 performs decoding. In this case, the greater a size of a buffer, the longer a device, such as the CPU 140, may stay in the power 'off' state, thereby reducing power consumption in the data processing system 100.

FIG. 3B illustrates a process of dynamically increasing the sizes of the first and second buffers 310 and 320, according to an embodiment of the inventive concept. Specifically, FIG. 3B illustrates a first long buffer 330 and a second long buffer 340 obtained by respectively increasing the sizes of the first and second buffers 310 and 320. The first and second long buffers 330 and 340 may also form a double buffer unit together. The first and second long buffers 330 and 340 have the same size of L2. In FIG. 3B, a location where an interrupt signal is generated and a current location that the audio data is transferred to data I/O unit 160. which are indicated by arrows, are the same in FIG. 3A. That is, it means that the first and second buffers 310 and 320 of FIG. 3A are changed to the first and second long buffers 330 and 340 of FIG. 3B. The first long buffer 330 and the second long buffer 340 have the same size of L2, and the size 'L2' of each of the first long buffer 330 and the second long buffer 340 should be greater than the sum of the sizes of the first buffer 310 and the second buffer 320 (i.e., 'L1'). That is, unless the size 'L2' of each of the first and second long buffers 330 and 340 is two times or more greater than the sum of the sizes of the first and second buffers 310 and 320 (i.e., 'L1') then no significant practical effects are achieved even when a point of time that rendering is performed is changed. For this reason, referring to FIG. 3B, a predetermined region 350 is added to the first long buffer 330. In other words, the predetermined region 350 is added to make the size 'L2' of the first long buffer 330 be greater than the sum of the sizes of the first and second buffers 310 and 320 (i.e., 'L1'). The total amount of new data that may be input to the predetermined region 350 are not restricted thereto.

The DMA controller 120 completes performing an operation to change buffer size before transmission of data stored in the second buffer 320 ends. That is, the DMA controller 120 may completely fill the predetermined region 350 with the new data before the transmission of the data stored in the second buffer 320 ends. Furthermore, data may be added to an unoccupied space in the first long buffer 330 before the predetermined region 350 is completely filled with the new data.

In general, a speed of transmitting data from the buffer 150 is controlled by the CPU 140 and the DMA controller 120 to be far slower than a speed of writing data to the buffer 150. Thus, the new data may be added to the predetermined region 350 and the first long buffer 330 may be completely filled with data, before the transmission of the data stored in the second buffer 320 ends. This process may be performed while data stored in the first and second buffers 310 and 320 is transmitted to the data I/O unit 160. However, some of various types of the DMA controller 120 may not be capable of adjusting buffer size during data transmission. In this case, data stored in the second buffer 320 may be completely transmitted, and then DMA transmission may be stopped without filling the second buffer 320 with data. Then, the sizes of the first buffer 310 and the second buffer 320 may be adjusted to obtain the first long buffer 330 and the second long buffer 340, and the DMA transmission may then start again. In this case, a time period between when the DMA transmission is stopped and when the DMA transmission starts again may be determined by the size of the FIFO buffer in the data I/O unit 160. For example, if the FIFO buffer is 64 words long, has a frequency of 44.1 KHz in an MP3 file format, and is allocated 16 bits for two channels, then the time period may be about 1.4 ms or less.

FIGS. 4A and 4B are diagrams specifically illustrating the process of FIGS. 3A and 3B. Specifically, FIGS. 4A and 4B illustrate a process of inputting data to/outputting data from the first and second buffers 310 and 320 and the first and second long buffers 330 and 340 in a chronological order, when the first and second buffers 310 and 320 form a double buffer unit together and the first and second long buffers 330 and 340 form a double buffer unit together. First, data is input to the first buffer 310 to a point of time T1. The input data is output to a point of time T2. Before the input data is completely output from the first buffer 310, data is input to the second buffer 320. In other words, the second buffer 320 completes a preparation for data transmission before the point of time T2. If the data input to the first buffer 310 is completely output to the point of time T2, then the data input to the second buffer 320 is output. The data input to the second buffer 320 is completely output to a point of time T3, and data is input to the first buffer 310 before the data input to the second buffer 320 is completely output. Then, the data input to the first buffer 310 is output to a point of time T4, and inputting of data to the second buffer 320 ends before the data input to the first buffer 310 is completely output. An interrupt signal is generated whenever inputting data to/outputting data from each of the first buffer 310 and the second buffer 320 ends. After the outputting of the data from first buffer 310 ends to the point of time T4, the interrupt signal is generated and outputting of the data input to the second buffer 320 starts.

New data is input to the predetermined region 350 during the transmission of the data from the second buffer 320. Also, inputting of data to the second long buffer 340 should end at least before the new data input to the predetermined region 350 is completely output (i.e., before a point of time T6).

Referring to FIG. 4B, before the new data is completely input to the predetermined region 350, the inputting of the data to the second long buffer 340 ends. The input new data is additionally input when the sum of the sizes of the first and second buffers 310 and 320 is less than the size of the first long buffer 330. Thus, when the size of the first long buffer 33Q is greater at least than the sum of the sizes of the first and second buffers 310 and 320, a significant practical effect may be achieved when a point of time that rendering is performed is changed. When the inputting of the new data to the predetermined region 350 ends to the point of time T6, the data input to the second long buffer 340 is output to a point of time T7. Before the outputting of the data input of the second long buffer 340 ends, inputting of data to the first long buffer 330 ends. Then, the data input to the first long buffer 330 is output from the point of time T7 to a point of time T8. While the data input to the first long buffer 330 is output, data is input to the second long buffer 340. Before the data input to the first long buffer 330 is completely output, the inputting of the data to the second long buffer 340 should end, thereby guaranteeing seamless data play. As described above, if buffer size is increased to be two times or more greater than the existing buffer size (e.g., to 'L2'), then more data may be stored and a time needed for the CPU 140 to be involved with performing decoding may be reduced. Accordingly, a data processing system may be driven with low power when an audio file is played.

FIGS. 5A and 5B are diagrams illustrating a process of reducing buffer size according to an embodiment of the inventive concept. Specifically, FIG. 5A illustrates a data transmission process performed using the first and second long buffers 330 and 340, the sizes of which are increased. The data transmission process performed using the first and second long buffers 330 and 340 is substantially the same as when using the first and second buffers 310 and 320, except that the first and second long buffers 330 and 340 are larger than the first and second buffers 310 and 320. Referring to FIG. 5A, no data is stored in the first long buffer 330, an interrupt signal is generated, and data stored in the second long buffer 340 is being transferred to an FIFO buffer (not shown) of the data I/O unit 160. The first long buffer 330 and the second long buffer 340 have the same size of L2.

FIG. 5B illustrates a process of reducing the sizes of the first long buffer 330 and the second long buffer 340, according to an embodiment of the inventive concept. If the buffer size is large, then it is easy to perform low-power driving but a response rate is slow when, for example, a user event needs to be performed or sound effects needs to be played. In the case of a double buffer unit, data transmission starts when at least one buffer is filled with data, and data stored in one buffer is transmitted only when transmission of data stored in another buffer ends. Thus, an increase in buffer size results in an increase in a time delay, thus delaying a response to a request for playing sound according to a user event.

The process of FIGS. 5A and 5B are related to the process described above with reference to FIGS. 3A to 4B. The process of FIGS. 5A and 5B are performed on an assumption that two buffers are used, but a total number of buffers is not limited to two. The interrupt signal generator 180 of FIG. 2 generates an interrupt signal when transmission of data stored in the first long buffer 330 ends. The interrupt signal is transmitted to the CPU 140. Upon receiving the interrupt signal, the CPU 140 may give a DMA transmission command. Then, data may be exchanged between the main memory 130 and an external I/O device (not shown). Specifically, when the CPU 140 receives the interrupt signal, the CPU 140 may give a data transmission command instructing that data be written to the first long buffer 330 since the first long buffer 330 is empty. Upon receiving a buffer_empty signal, the CPU 140 may transmit a DMA transmission command containing an address of the main memory 130 and an address of the buffer 150 to the DMA controller 120. The DMA controller 120 may receive the DMA transmission command from the CPU 140, and transmit audio data stored in the main memory 130 to the first long buffer 330. Also, the DMA controller 120 may transmit data stored in the second long buffer 340 to the data I/O unit 160.

In FIG. 5B, a size 'X' may be set by adding the size of the first long buffer 330, a count value of the second long buffer 340 from which data is being transmitted, and the size of a spare buffer 560 determined by a time needed to transmit data stored in new buffers 510 and 520 obtained by reducing the size of the second long buffer 340 together. The size 'X' may be expressed as 'TC+(T1*R*B*C/8)+T2'. Here, 'TC' denotes a current location from which data is transferred (i.e., a current transmission count), 'T1' denotes a time needed to copy data from new buffers 540 and 550, 'T2' denotes a time needed to transmit PCM data stored in the new buffers 510 and 520, 'R' denotes a sampling rate, 'B' denotes a sample bit length, and 'C' denotes a channel count.

The new buffers 540 and 550 may be set in regions remaining after the size 'X' is subtracted from the size of the second long buffer 340. Here, the new buffers 540 and 550 may denote data remaining after the size 'X' is set. The remaining data is moved to the new buffers 510 and 520 set at a starting address of the first long buffer 330. Then, data 530 remaining after the remaining data is moved to the new buffers 510 and 520, is also moved to the new buffers 510 and 520. Since a time needed to transmit data from these buffers is far longer than an operating time of the CPU 140, the above operations may be completed before data stored in the spare buffer 560 is completely transmitted.

If the interrupt signal is generated after transmission of the data stored in the second long buffer 340 ends, the DMA controller 120 may reduce the size of the second long buffer 340. In other words, the new buffers 510 and 520 obtained by reducing the second long buffer 340 may have the same size of L1. That is, the sizes of the new buffers 510 and 520 may be equal to those of the original first buffer 310 and second buffer 320. The sizes of the new buffers 510 and 520 may be the same as or different from those of the first and second buffers 310 and 320.

However, some of various types of the DMA controller 120 may not be capable of adjusting buffer size during data transmission. In this case, the DMA controller 120 may wait until transmission of data stored in the second long buffer 340 ends, and stops DMA transmission without filling the second long buffer 340 with data when the transmission of the data stored in the second long buffer 340 ends. Then, the DMA controller 120 may change the first long buffer 330 and the second long buffer 340 to the new buffers 510 and 520 by adjusting the sizes of the first long buffer 330 and the second long buffer 340, and then restart the DMA transmission.

In this case, a time period between when the DMA transmission is stopped and when the DMA transmission restarts may be determined by the size of a FIFO buffer (not shown) in the data I/O unit 160. For example, if the FIFO buffer is 64 words long, has a frequency of 44.1 KHz in an MP3 file format, and is allocated 16 bits for two channels, then the time period may be about 1.4 ms or less, but the inventive concept is not limited thereto. As described above, buffer size may be reduced at once. If buffer size is reduced, a response rate to, for example, sound according to a user event or a user's activity may increase. In other words, a time delay caused when buffer size is long may be reduced.

Figure 6:
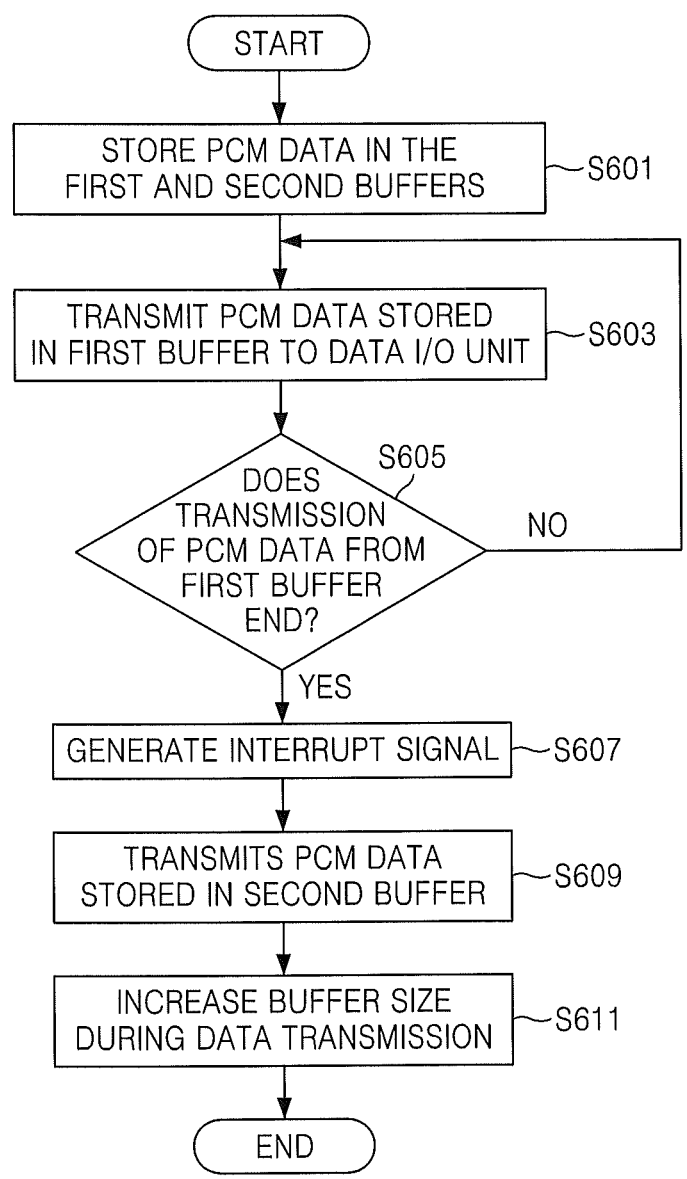
FIG. 6 is a flowchart illustrating a process of increasing buffer size, according to an embodiment of the inventive concept.

FIG. 6 is a flowchart illustrating a process of increasing buffer size, according to an embodiment of the inventive concept. Referring to FIGS. 2 and 6, the DMA controller 120 stores data in the first and second buffers 310 and 320 of FIG. 3A, under control of the CPU 140 (operation S601). Then, the data stored in the first buffer 310 is transmitted to a FIFO buffer (not shown) of the data I/O unit 160 (operation S603). Then, the DMA controller 120 determines whether the transmission of the data from the first buffer 310 ends (operation S605). If it is determined in operation S605 that the transmission of the data from the first buffer 310 ends, the interrupt signal generator 180 generates an interrupt signal (operation S607). The interrupt signal is transmitted to the CPU 140. Then, the DMA controller 120 directly transmits the data stored in the second buffer 320 to the data I/O unit 160, based on the interrupt signal transmitted to the CPU 140 (operation S609). During the transmission of the data stored in the second buffer 320, the DMA controller 120 increases the sizes of the first buffer 310 and the second buffer 320 (operation S611).

FIG. 7 is a flowchart specifically illustrating the increasing of the sizes of the first buffer 310 and the second buffer 320, which is included in the process of FIG. 6, according to an embodiment of the inventive concept. That is, FIG. 7 specifically illustrates operation 5611 included in the process of FIG. 6. Referring to FIG. 7, the DMA controller 120 may change the sizes of the first buffer 310 and the second buffer 320 to obtain the first long buffer 330, the size of which is greater than the sum of the sizes of the first buffer 310 and the second buffer 32Q (operation S701). Then, the DMA controller 120 determines whether the size of the first long buffer 330 is greater than the sum of the sizes of the first buffer 310 and the second buffer 320 (operation S703). If the size of the first long buffer 330 is greater than the sum of the sizes of the first buffer 310 and the second buffer 320, the DMA controller 120 generates a second long buffer 340 (operation S705). The size of the second long buffer 340 may be equal to that of the first long buffer 330.

If the size of the first long buffer 330 is less than the sum of the sizes of the first buffer 310 and the second buffer 320, new data is additionally written to the first long buffer 330 so that the size of the first long buffer 330 may be greater than the sum of the sizes of the first buffer 310 and the second buffer 320 (operation S707). This is because when the size of the first long buffer 330 is two times or more greater than the sum of the sizes of the first and second buffers 310 and 320, it is meaningful to increase buffer size so as to save power. Then, the DMA controller 120 may generate the second long buffer 340, the size of which is equal to the size of the first long buffer 330 (operation S705).

FIG. 8 is a flowchart illustrating a process of reducing buffer size, according to an embodiment of the inventive concept. If sound according to a user event or a user's activity is generated while a data processing system is driven with low power by using the first long buffer 330 and the second long buffer 340 of FIG. 4A, then the DMA controller 120 of FIG. 2 reduces the sizes of the first long buffer 330 and the second long buffer 340 so as to increase a response rate to the sound according to the user event or the user's activity.

Referring to FIGS. 2 and 8, first, the DMA controller 120 transmits data stored in the first long buffer 330 and ends the transmission (operation S801). Then, the interrupt signal generator 180 generates an interrupt signal (operation S803). When the interrupt signal is generated, the DMA controller 120 directly transmits data stored in the second long buffer 340. If a user event occurs during the transmission of the data from the second long buffer 340, the DMA controller 120 sets buffer size to a size 'X' (operation S805). The size 'X' may be expressed as 'TC+(T1*R*B*C/8)+T2'. Here, 'TC' denotes a current location from which data is transferred (i.e., a current transmission count), 'T1' denotes a time needed to copy data from the new buffers 540 and 550 of FIG. 5, 'T2' denotes a time needed to transmit PCM data stored in the new buffers 510 and 520 of FIG. 5, 'R' denotes a sampling rate, 'B' denotes a sample bit length, and 'C' denotes a channel count.

Then, the DMA controller 120 sets a part of a region of the second long buffer 340 from which data has yet to be transmitted, as the new buffers 540 and 550 (operation S807). Addresses of the new buffers 510 and 520 are the same as a starting address of the first long buffer 330. Thus, data stored in the new buffers 540 and 550 of the second long buffer 340 is moved to the starting address of the first long buffer 330 (operation S809).

Then, the data remaining in the other part of the region of the second long buffer 340 from which the data has yet to be transmitted, is also moved to the new buffers 510 and 520 (operation S811). Then, transmission of data remaining in a region of the second long buffer 340 corresponding to the size 'X' ends (operation S813). Then, the interrupt signal generator 180 generates the interrupt signal again (operation S815).

Upon receiving the interrupt signal from the CPU 140, the DMA controller 120 reduces the sizes of the first and second long buffers 330 and 340 to obtain the new buffers 510 and 520 (operation S817). When buffer size is reduced, it is possible to promptly respond to a user's activity, since a reduction in buffer size results in a reduction in a time delay. If a user event does not occur, the DMA controller 120 may increase buffer size to process data while saving power. That is, DMA controller 120 may dynamically increases or reduces buffer size according to a situational condition.

According to the one or more embodiments of the inventive concept, when a user's activity does not occur, buffer size may be increased to reduce power consumption. A rendering wake-up cycle may be increased by increasing buffer size, thereby saving power consumed for operations other than audio reproduction. When a system is in an idle state, the system may enter a low power mode, and dynamic voltage and frequency scaling (DVFS) may be used. If a user's activity occurs, buffer size may be reduced, thus improving a response rate to reproducing an audio signal related to the user's activity. The rendering wake-up cycle may be reduced by reducing buffer size. Thus, a time delay in playback of the audio signal related to the user's activity may be reduced. This is because it takes a time to fill a first buffer with data, since audio reproduction is performed in units of DMA buffers. Accordingly, since buffer size is proportional to a time delay in audio reproduction, a time delay in audio playback may be reduced by reducing buffer size.

While the inventive concept has been particularly shown and described with reference to exemplary embodiments thereof, it will be understood that various changes in form and details may be made therein without departing from the spirit and scope of the following claims.

What is claimed is:

1. A data processing system comprising: an audio processor comprising a plurality of buffers configured to store audio data and a data input/output (I/O) unit for outputting the stored audio data; and
  a direct memory access (DMA) controller configured to transmit audio data stored in a second of the plurality of buffers in response to a first interrupt signal designating termination of transmission of audio data stored in a first of the plurality of buffers and increase sizes of the plurality of buffers into a plurality of long buffers during transmission of audio data stored in the second buffer,
  wherein said DMA controller is further configured to receive new data from a main memory and, when the size of each of the plurality of long buffers is less than the sum of the size of the first buffer and second buffer, increase a size of a first of the plurality of long buffers corresponding to the first buffer in order to store the new data in the first long buffer and adjust the size of each of the plurality of long buffers to be equal to the size of the first long buffer, wherein said DMA controller is further configured to transmit the new data from the first long buffer and, before transmission of the new data from the first long buffer ends, said DMA controller completes storing of other new data received from the main memory into the second long buffer corresponding to the second buffer, and wherein in response to generation of a second interrupt signal designating termination of transmission of data from the first long buffer, said DMA controller sets a size X based on at least a size of the first long buffer and a count value of the second long buffer when the second interrupt signal is generated.

2. The data processing system of claim 1, wherein the plurality of long buffers have equivalent storage sizes; and wherein a storage size of each of the plurality of long buffers is greater than a sum of a size of the first buffer and a size of the second buffer.

3. The data processing system of claim 1, wherein said DMA controller is further configured to finish storing the new data in the first long buffer in advance of transmitting all audio data stored in the second buffer.

4. The data processing system of claim 1, wherein in response to the generation of the second interrupt signal designating termination of transmission of data from the first long buffer, said DMA controller sets the size X by adding the size of the first long buffer, the count value of the second long buffer when the second interrupt signal is generated, and a size of a spare buffer determined by a time required to transmit data stored in a new buffer obtained by reducing the size of the second long buffer.

5. The data processing system of claim 4, wherein the size X corresponds to TC+(T1*R*B*C/8)+T2, wherein 'TC' denotes a current transmission count, 'T1' denotes a time required to copy data to the new buffer, 'T2' denotes a time required to transmit the data stored in the new buffer, 'R' denotes a sampling rate, 'B' denotes a sample bit length, and 'C' denotes a channel count.

6. The data processing system of claim 4, wherein said DMA controller moves an address of the new buffers to a starting address of the first long buffer, moves the data, which is stored in the second long buffer and is ready to be transmitted, to the new buffers, and reduces a total size of the plurality of long buffers to the size of the new buffers when a third interrupt signal is generated designating termination of transmission of data from the second long buffer.

7. A method of operating a data processing system, the method comprising:

receiving data and storing the data in a plurality of buffers;
transmitting the stored data to a data input/output (I/O) unit so as to output the stored data;
generating a first interrupt signal when transmission of data stored in a first buffer from among the plurality of buffers ends;
transmitting data stored in a second buffer from among the plurality of buffers when the first interrupt signal is generated; and
increasing sizes of the plurality of buffers during the transmission of the data stored in the second buffer, wherein the increasing of the sizes of the plurality of buffers comprises changing the plurality of buffers to a plurality of long buffers, wherein the increasing of the sizes of the plurality of buffers further comprises, when the size of each of the plurality of long buffers is less than a sum of the sizes of the first buffer and the second buffer, increasing the size of a first long buffer corresponding to the first buffer from among the plurality of long buffers so as to store new data in the first long buffer and adjusting the sizes of the plurality of long buffers to be equal to the size of the first long buffer, and wherein, in response to generation of a second interrupt signal designating termination of transmission of data from the first long buffer, a size X is set based on at least a size of the first long buffer and a count value of the second long buffer when the second interrupt signal is generated.

8. The method of claim 7, wherein the transmitting data stored in the second buffer comprises completing storing of the new data in the first long buffer in advance of transmission of all data stored in the second buffer.

9. The method of claim 7, wherein the transmitting data stored in the second buffer comprises, in advance of transmission of the data from the first long buffer, completing storing of other new data in a second long buffer corresponding to the second buffer from among the plurality of long buffers.

10. The method of claim 7, wherein, in response to the generation of the second interrupt signal designating termination of transmission of data from the first long buffer, the size X is set by adding the size of the first long buffer, the count value of the second long buffer when the second interrupt signal is generated, and a size of a spare buffer determined by a time required to transmit data stored in a new buffer obtained by reducing the size of the second long buffer together.

11. The method of claim 10, wherein the size X corresponds to TC+(T1*R*B*C/8)+T2,
wherein 'TC' denotes a current transmission count, 'T1' denotes a time required to copy data to the new buffer, 'T2' denotes a time required to transmit data stored in the new buffer, 'R' denotes a sampling rate, 'B' denotes a sample bit length, and 'C' denotes a channel count.

12. The method of claim 10, further comprising:
moving an address of the new buffers to a starting address of the first long buffer;
moving data which is stored in the second long buffer and is ready to be transmitted, to the new buffers; and
reducing a total size of the plurality of long buffers to the size of the new buffers when a third interrupt signal designating termination of transmission of data from the second long buffer is generated.

* * * * *